United States Patent

[11] 3,554,375

| [72] | Inventor | Allan H. Willinger |
| | | New Rochelle, N.Y. |
| [21] | Appl. No. | 754,249 |
| [22] | Filed | Aug. 21, 1968 |
| [45] | Patented | Jan. 12, 1970 |
| [73] | Assignee | Metaframe Corporation |
| | | Hawthorne, Calif. |
| | | a corporation of Delaware, by mesne assignments |

[54] AQUARIUM FILTRATION DEVICE
11 Claims, 6 Drawing Figs.

[52] U.S. Cl. .................................................. 210/169
[51] Int. Cl. .................................................. E04h 3/20
[50] Field of Search .......................................... 210/169;
119/5; 103/53; 230/55

[56] References Cited
UNITED STATES PATENTS

| 2,177,795 | 10/1939 | Van Dolden | 230/55 |
| 2,783,893 | 3/1957 | Romanoff | 119/5 |
| 3,116,695 | 1/1964 | Faller | 103/53 |
| 3,321,082 | 5/1967 | Willinger | 210/169 |

*Primary Examiner*—Reuben Friedman
*Assistant Examiner*—T. A. Granger
*Attorney*—Friedman and Goodman

ABSTRACT: An aquarium filtration device in which optimum advantage is taken of the siphon inlet and the flow outlet fluid connections between two water bodies by the use, in combination therewith, of a valveless pump, the dynamics of the fluid connections imposing the required unidirectional fluid flow and thereby enabling efficient operation of the pump without pump inlet and outlet valves.

INVENTOR.
ALLAN H. WILLINGER
BY Friedman & Goodman
Attorneys

AQUARIUM FILTRATION DEVICE

The present invention relates generally to an aquarium filtration device, and more particularly to an improved combination pump and operative fluid connections for continuously circulating the water volume of an aquarium through a filtering medium.

As generally understood, the proper maintenance of an aquarium requires continuous water filtration. In accordance with present practice, a typical-filtering device may include a separate-filtering tank continuously receiving water for filtration through a siphon connected to it from the aquarium tank, a conventional reciprocating diaphragm or centrifugal pump, and an outlet connected from the pump to the aquarium tank for returning filtered water to the latter. In devices using a reciprocating diaphragm pump, it is believed necessary to have the usual pump inlet and outlet valves to provide controlled fluid flow in synchronization with pump operation and, with a centrifugal pump, the pressure gradient is relied on to achieve proper fluid directional flow. In both cases, any reduction in manufacturing cost, or minimizing of operating malfunctions or other such improvements are achieved by structural modifications to the pump rather than as the result of a significant change in the device, with the result that the attendant improvements are of a limited nature.

Broadly, it is an object of the present invention to provide an improved aquarium filtration device overcoming the foregoing and other shortcomings of the prior art. Specifically, it is an object to provide an improved filtration device, applied to an aquarium, in which an optimum, efficiently operating arrangement of available fluid connections and pump is made which enables the elimination of fluid flow control valves.

An aquarium filtration device demonstrating objects and advantages of the present invention includes a separate filtering tank as well as the main aquarium tank, each respectively containing a separate water body, an outlet which is restricted by flow to fluid movement only in the direction from the filtering tank to the aquarium tank and thereby imposes on the siphon inlet to the filtering tank movement of a corresponding amount of water, in order to equalize the water levels, from the aquarium tank into the filtering tank; thus, the device inherently and without pump valves or a created pump pressure gradient operates with the required complementary directional fluid flow through the inlet and outlet fluid connections between the two water bodies. The pump used is therefore needed only to move or displace water through the outlet, a requirement satisfied by a selected valveless pump, all as is hereinafter more fully described.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein:

FIGS. 1—4 illustrate a first embodiment of the present invention, namely to wit:

Figure 1:
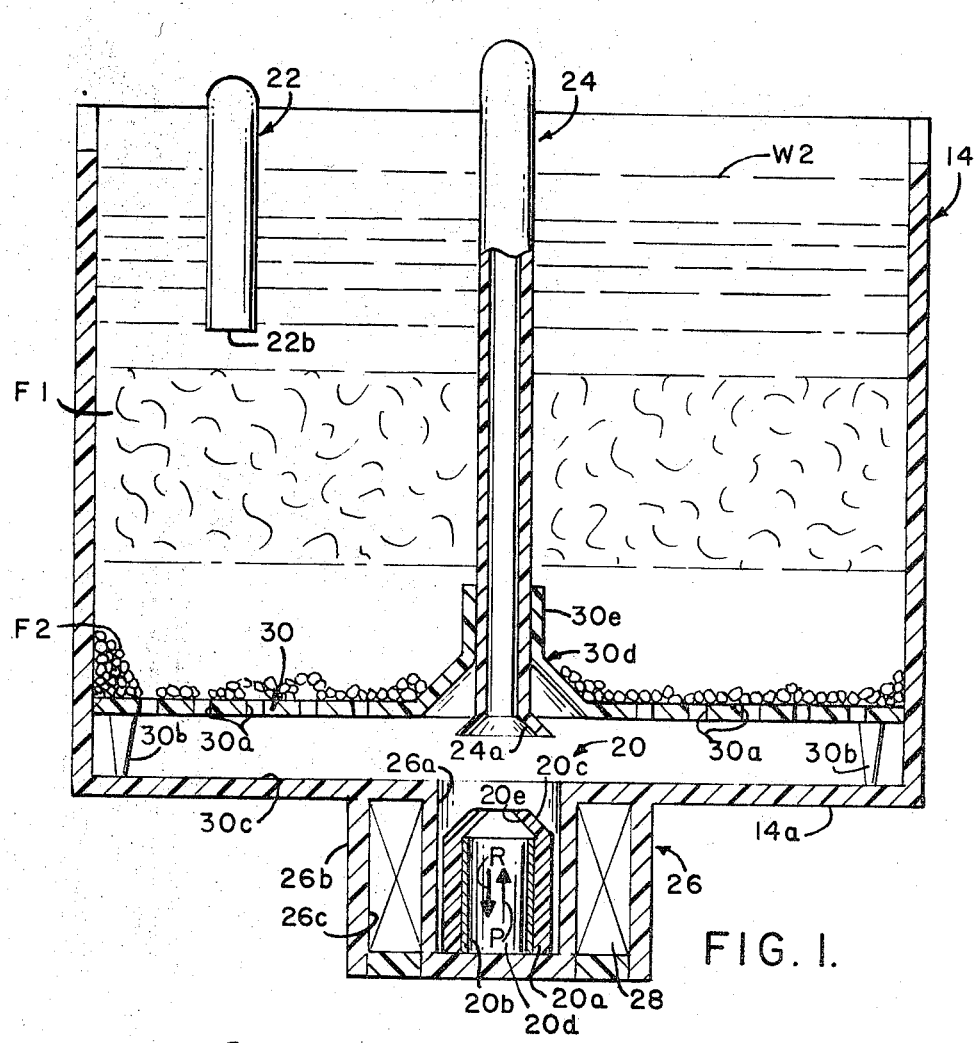
FIG. 1 is a front elevational view, in section, of a filtering tank of an aquarium filtration device according to the present invention.
Figure 2:
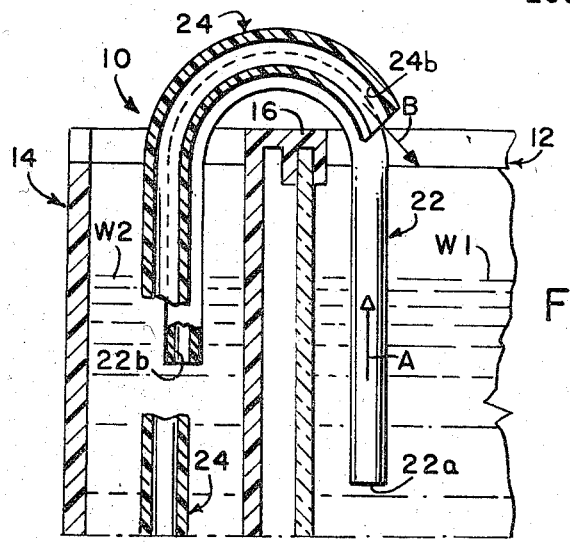
FIG. 2 is a partial side elevational view in section, showing the fluid connections between the filtering tank and the aquarium tank.

Reference is now made to the drawings, and in particular to FIGS. 1—4, illustrating a first embodiment of an aquarium filtration device demonstrating objects and advantages of the present invention. As is perhaps best shown in FIGS. 2, 3, the aquarium filtration device, generally designated 10, includes the conventional components of an aquarium tank 12 having a comparatively large volume or body of water W1 for the display of fish by the hobbyist and which body of water, as generally understood, requires constant filtration. This is achieved using the filtration device 10 which includes a smaller filtering tank 14 appropriately supported along an edge of the aquarium tank 10 as by a mounting clip 16 and containing a lesser volume or body of water W2, as well as, as best shown in FIG. 1, layers of filtering materials F1, F2, which may be selected from a wide range of materials having water-filtering properties. In practice, water volume W2 continuously drains through the filtering layers, F1, F2 and in the process if filtered clean and, in this filtered condition, is returned to the aquarium tank body W1. From what has been thus far described it should be readily apparent that effective operation of not only the present aquarium filtration device but any such device requires means for continuously circulating or flowing the water from the water body W1 into the water body W2 and then, after filtering, back to the water body W1. In accordance with the present invention, this means consists, in part, of a valveless pump, generally designated 20, the absence of the usual inlet and outlet valves for the same resulting, in an obvious manner, in a substantially reduced cost of manufacture, attendant minimizing of valve malfunctioning and other significant benefits.

Working in cooperation with the valveless pump 20 and comprising the other significant part of the aquarium filtration device 10 hereof are certain fluid connections between the water bodies W1, W2 which contribute to the ability of the pump 20 to operate efficiently without valves. Although these fluid connections, now to be described in detail, have been heretofore used in aquarium-filtering systems, their unique and advantageous use in association with a valveless pump has not heretofore been appreciated, and thus, this appreciation is a significant aspect of the present invention.

These fluid connections between the water bodies W1, W2 include an inlet 22, preferably a siphon, which, when in operation, has its opposite ends 22a, 22b submerged in the water bodies and, in a well understood manner, is effective to produce fluid flow between these water bodies. Moreover, it has been specifically appreciated that the dynamics of the device including the siphon 22 is such that fluid flow is unidirectional through the siphon 22 and, more particularly, must occur in the direction A for reasons soon to be detailed; that is, the flow is always from the water body W1 into the water body W2. The other fluid connection consists of an outlet conduit or tube 24 which, in its operative position, has an outwardly flared end opening 24a submerged in the water body W2 and, at its opposite end has a curved section which terminates in an end opening 24b occupying a preferably elevated clearance position above the water body W1 and which, of necessity, thus requires that any water exiting from the opening 24b fall under the influence of gravity into the water body W1. However, it is understood that the filtration device 10 would operate properly even if the opening 24b was submerged in the water body W1. Accordingly, the fluid flow in the conduit 24 must, of necessity, be unidirectional and, more particularly, always occur in the direction B. This is significant since the volume of water exiting from the outlet conduit 24 naturally increases the water volume W1 and, more particularly, raises the level of this water body relative to the water body W2, and this thus causes a corresponding amount of water to flow, as already noted, in the direction A through the siphon tube 22 from water body W1 to water body W2 until there is again an equalization of the water levels. Thus, as has been recognized in accordance with the present invention, the water filtration device 10 hereof which utilizes the fluid connections 22, 24 in cooperation with a pumping means has, as an inherent operating aspect thereof, an imposed requirement for unidirectional flow in the directions A, B; thus, the pumping means used in this device does not actually require any valves such as is usually required to control and produce unidirectional flow. Consequently, pumping means 20, as already noted, is specifically selected since it is effective in producing fluid flow through the outlet conduit 24 and has no inlet or outlet valves.

Figure 3:
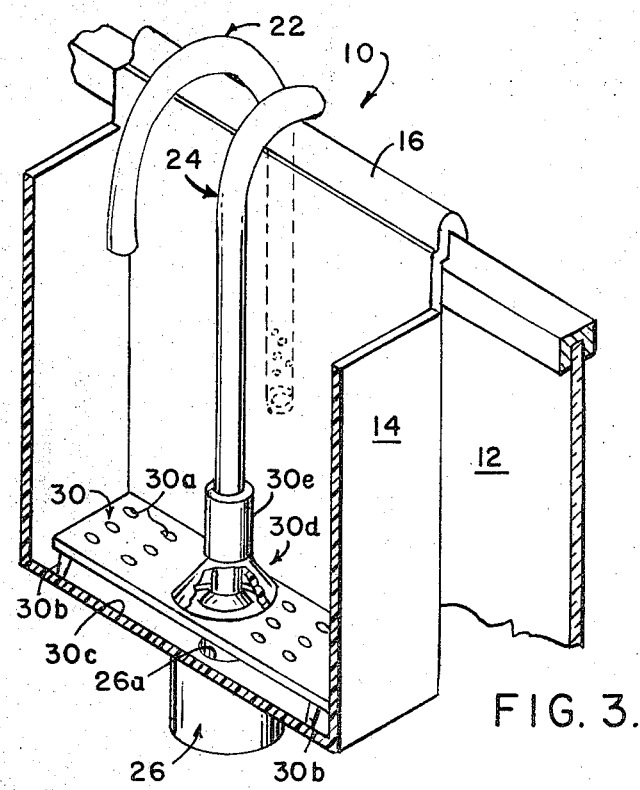
FIG. 3 is a partial perspective view, in section, principally of the filtering tank, with the front wall thereof removed and with portions broken away to better illustrate internal structural features.
Figure 4:
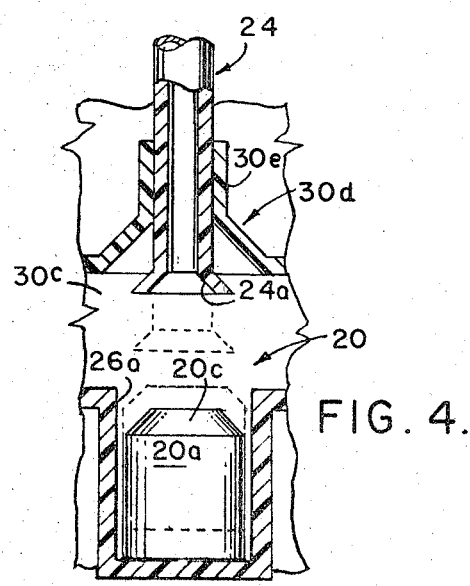
FIG. 4 is a partial side elevational view, in section, similar to FIG. 2, but illustrating details of the pumping means for the filtration device and wherein movable and adjustable parts thereof are illustrated in full line and phantom line perspective.

Turning now more specifically to a preferred form for the valveless pump 20, the same as illustrated in simplified form in FIGS. 1, 3 and 4, includes a piston 20a, which, when not per se fabricated of a magnetically attracted material includes sleeve 20b fabricated of such material appropriately secured, as by friction fit, within the piston 20a. Integrally molded as part of the filtering tank bottom wall 14a is a depending piston housing 26 including an internal cylindrical wall 26a of slightly greater diameter than the piston 20a which effectively serves to confine the piston to a prescribed path during the reciprocating movements thereof. A housing outer wall 26b is spaced from the inner wall 26a and cooperates therewith to define an annular, waterproof sealed compartment 26c for a conventional magnetic field producing coil, diagrammatically illustrated and designated 28 in FIG. 1. As generally understood, and in accordance with operation contemplated by the present invention, coil 28 is electrically energized so as to produce magnetic fields of alternating polarity which has the operative effect of producing, in a well understood manner, vertically reciprocating movements in the piston 20a such as are illustrated in full line and phantom perspective in FIG. 4. That is, piston 20a, submerged in the water body W2 within its compartment 26a, occupies a starting clearance position relative to the flared tubular opening 24a as illustrated in FIG. 1 and, upon operation of the coil 28, is actuated through an upward stroke P to an adjacent terminal position in closer proximity to the flared opening 24a.

The end of the upward stroke P of piston 20a occurs with the reversal of polarity of the field producing coil 28 and is effective, in addition to the influence of gravity, of producing movement of the piston 20a through a downward stroke R to its initial starting clearance position. The piston 20a has an axial bore 20d terminating in a small diameter opening 20e in the piston surface 20c, through which bore 20d and opening 20e there is effective water movement during the piston downward movement R, as set forth hereinbelow. As shown in the drawings, the opening 20e is substantially in axial alignment with the flared opening 24a of the outlet tube 24, with the flared opening 24a being provided with a mouth larger than the opening 20e.

The mode of operation of the pump 20 may be explained as follows: During the movement of the piston 20a through the upward stroke P towards the adjacent flared opening 24a, the volume of water between the piston 20a and the outlet tube 24 is displaced and flows partly into the flared opening 24a and partly through the small opening 20e in the piston surface 20c into the larger bore 20d to fill the space below vacated by the piston 20a. When the piston 20a is reversed and moves through the downward stroke R, the volume of water within the bore 20d and within the space below the piston 20a is displaced, and because the opening 20e is smaller than the bore 20d, a jet of water issues out of the small opening 20e. This jet of water is directed into the mouth of the adjacent flared opening 24a of the outlet tube 24, which is substantially in axial alignment with the opening 20e as stated above, causing a corresponding displacement of a volume of water within the tube 24.

The momentum imparted to the volume of water on the downward stroke R of the piston 20a causes the volume of water to continue up the tube 24. The acceleration of the volume of water tends to be reduced due to the gravity acting on the water column of the tube 24. The next upward stroke P of the piston 20a displaces an additional volume of water which tends to slow down the return of the volume of water within the tube 24 to its original position.

However, the volume of water is again caused to move up the tube 24 by the next jet of water issued on the following downward stroke R of the piston 20a, which occurs before the volume of water has time to flow back down the tube 24 to its original position. This pump action occurs over and over again, so that a succession of jets of water enables the piston 20a to pump the volume of water, up the tube 24, ultimately causing water to continuously exit from the opening 24b of the tube 24 for flow into the water body W1.

As is perhaps best illustrated in FIGS. 1, 3, the support for the filtering layers F1, F2 within the filtering tank 14 consists of a trivet 30 having numerous drainage holes 30a therein. Further, legs 30b support the trivet in a clearance position from the tank bottom wall 14a so as to define a compartment 30c in communication with the pump compartment 26a for water filtering through the layers F1, F2 and, in a cleaned or filtered state, returned by the pump 20 to the main water body W1. Trivet 30 also includes an integrally molding upstanding mounting wall 30b, at a medial location, having a hollow cylindrical section 30e with an inside diameter sized to receive the conduit 24 in a force fit to thereby normally hold the conduit 24 stationary in a vertical orientation as illustrated. The force fit, however, does not preclude making adjustment movements in the conduit 24 through a range of positions of movement closer or farther away from the piston 20a, all as is clearly illustrated in full line and phantom line perspective in FIG. 4. When conduit 24 is projected closer to the piston 20a the volume of water displaced through it during successive strokes of the piston 20a is at a maximum and, of course, the reverse is true as the distance separating the flared opening 24a and piston 20a is increased. This provides selective control over the volume or rate of water being filtered by the aquarium filtration device 10, permitting the hobbyist to adapt the flow of water to suppress noise, minimize disturbance to the environment and achieve other benefits.

Figure 5:
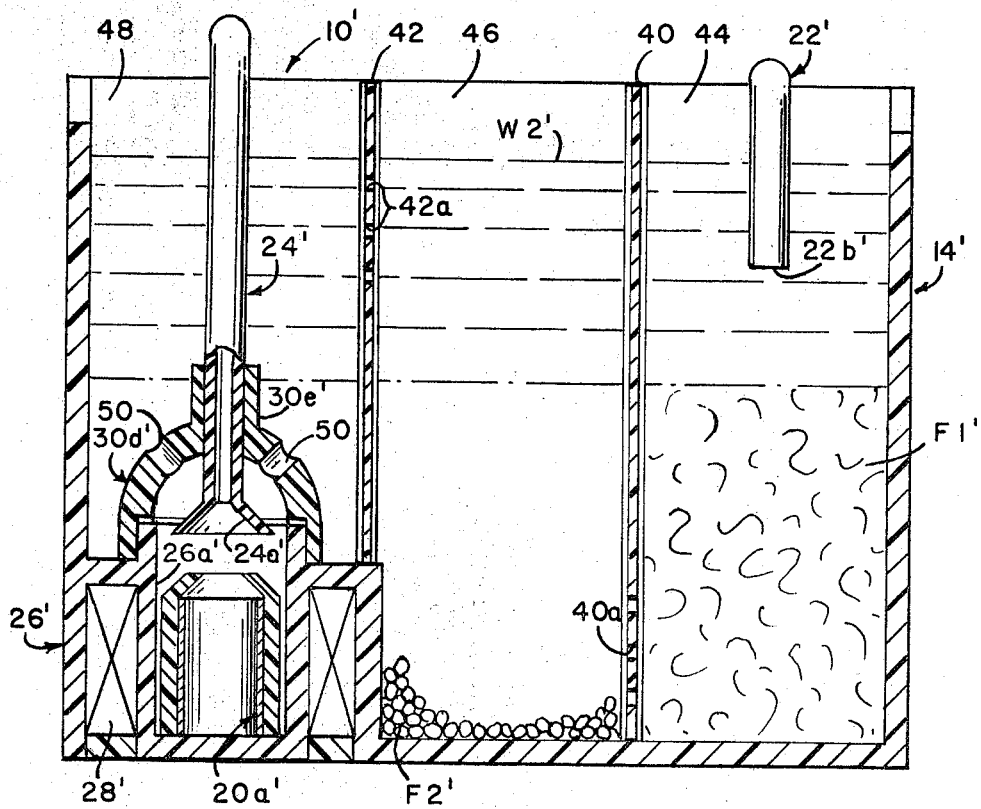
FIG. 5 is a sectional front elevational view similar to FIG. 1 but of the essentials of a second embodiment of an aquarium filtration device according to the present invention.
Figure 6:
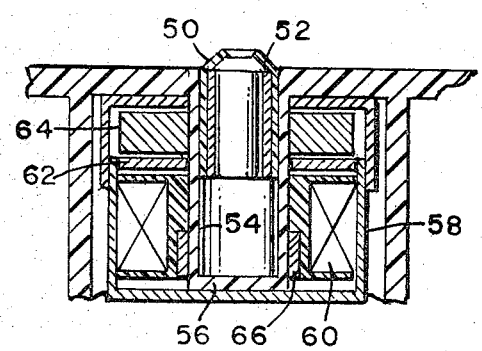
FIG. 6 is a side elevational view, in section, an enlarged scale, of an exemplary valveless pump that may be used in the aquarium filtration device embodiments hereof.

Reference is now made to a second embodiment of the aquarium filtration device as illustrated in FIG. 5 in which like parts are designated by the same but primed reference numerals. In this embodiment, filtering tank 14' includes two transversely oriented divider walls 40, 42 which divide the interior thereof into two filtering compartments 44, 46, respectively, each containing filtering materials F1', F2', and also into a pump compartment 48. The submerged end 22b' of the siphon 22' is located in compartment 44 such that the direction of flow is initially into this compartment and through the filter material F1', through the wall openings 40a into compartment 46 into filtering contact with the other filter material F2', and finally through upper wall openings 42a into the pump compartment 48. In the second embodiment 10', the coil and piston housing 26' is formed as an integral part of the tank 14' rather than as a separate depending enclosure, as in the case of previously described embodiment 10.

For brevity sake, the description of the housing 26' and of the valveless pump 20', which will be understood to be similar to the previously described pump 20, will not be repeated and reference will be limited to structural differences of the embodiments. These differences consist essentially of an extension or greater longitudinal dimension in the wall 26a ' which bounds the piston 20a', which extension cooperates with a wall structure 30d' to form a fully enclosing pumping chamber 26a ' about the piston 20a ' and the conduit operative end 24a'. It has been found that by enclosing the operative portions of the pump 20' within the surrounding structure 26a', 30d', as illustrated, that the pumping capacity of the pump is increased since the enclosure contributes to a more effective channeling of the water displaced by the moving piston 20a ' into the outlet conduit 24'. The confining wall 30d' contains suitable inlet openings 50 for entry of the filtered water into the pumping compartment 26a' preparatory to return through the outlet conduit 24' to the main water body.

From the foregoing, it should be readily apparent that both embodiments of the aquarium filtration device 10, 10' hereof make advantageous use of the siphon and flow fluid connections between two water bodies to permit use of a unique and advantageous combination therewith of a pumping means 20, 20' which does not require the usual fluid flow direction controlling valves and, as a consequence, avoids use of expensive pump parts, eliminates a major source of malfunction as well as providing other commercial advantages and benefits.

For completeness sake, a more detailed structural showing is made in FIG. 5 of the pumping means 20 previously described in its essential aspects in connection with FIG. 1. Pump 20, which may be selected from a wide range of electromagnetically driven liquid pumps, as exemplified by the pumps of U.S. Pat. Nos. 2,177,795 and 3,116,695, in a preferred form has piston 20a (illustrated at the end of its upward stroke) fabricated as a plastic shell 50 with a magnetic metal core 52. The piston 20a operates within an integral molded depending chamber defined by a cylindrical sidewall 54 and bottom wall 56. Surrounding the piston 20a and encased by a depending steel jacket 58 is a bobbin wound copper wire magnet 50 spaced by a steel washer 62 from a permanent ferrite magnet 64. A pole piece, in the form of a cylindrical steel tube 66 is strategically located between the lower end of the magnet 60 and the chamber sidewall 54.

A latitude of modification, change and substitution is intended in the foregoing disclosure and in some instances some features of the invention will be employed without a corresponding use of other features.

I claim:

1. An aquarium filtration device for use with an aquarium tank containing a first volume of water, said device comprising a filtering tank operatively associated with said aquarium tank containing a second lesser volume of water and means for filtering the same, a siphon operatively arranged in communication with both said volumes of water so as to serve as an inlet to said filtering tank during unidirectional fluid flow of water from said aquarium tank into said filtering tank, a filtering tank outlet conduit having first and second operative openings at opposite ends thereof operatively arranged with said first operative opening submerged in said water volume in said filtering tank to define an inlet opening and said second operative opening in communication with said water volume in said aquarium tank to define an outlet opening such that there is unidirectional fluid flow from the second operative opening of said outlet conduit into said aquarium tank, and a valveless pumping means located in alignment with said submerged first operative opening of said outlet conduit including a water-displacing member operatively arranged for movement through strokes between a position removed from said outlet conduit and an alternate position in closer proximity thereto such that during each of said strokes away from said alternate position, an amount of previously filtered water within said filtering tank is forced into said outlet conduit, whereby said amount of previously filtered water by displacement causes said unidirectional fluid flow through said outlet conduit and a corresponding amount of water in opposing unidirectional flow to move from said aquarium tank into said filtering tank.

2. An aquarium filtration device as defined in claim 1, wherein said submerged first operative inlet opening of said outlet conduit is flared to facilitate the movement of water into said conduit.

3. An aquarium filtration device as defined in claim 2, wherein said outlet conduit is adjustably movable through a range of positions of movement relative to said water-displacing member to thereby selectively control the amount of water forced into said outlet conduit during each of said strokes of said water-displacing member away from said alternate position.

4. An aquarium filtration device as defined in claim 3, including a wall bounding the path of movement traversed by said water-displacing member during said strokes thereof effective to channel water into said outlet conduit.

5. An aquarium filtration device for use with an aquarium tank containing a first volume of water, said device comprising a filtering assembly supported on said aquarium tank including a filtering tank containing a second lesser volume of water, a raised trivet located within said filtering tank in a clearance position from said tank bottom wall so as to define a pump compartment therebelow and filtering material supported on said trivet, a siphon operatively arranged in communication with both said volumes of water so as to serve as an inlet to said filtering tank during unidirectional fluid flow of water from said aquarium tank into said filtering tank, a filtering assembly outlet conduit having first and second operative openings at opposite ends thereof operatively arranged with said first operative opening projected into said filtering tank pump compartment to define an inlet opening and said second operative opening in communication with said water volume in said aquarium tank to define an outlet opening such that there is unidirectional fluid flow from the second operative opening of said outlet conduit into said aquarium tank, and a valveless pumping means located in said pump compartment in alignment with said submerged first operative opening of said outlet conduit including a water-displacing piston operatively arranged for movement through strokes between a position removed from said outlet conduit and an alternate position in closer proximity thereto such that during each of said strokes away from said alternate position, an amount of previously filtered water within said filtering tank is forced into said outlet conduit, whereby said amount of previously filtered water by displacement causes said unidirectional fluid flow through said outlet conduit and a corresponding amount of water in opposing unidirectional flow to move from said aquarium tank into said filtering tank.

6. An aquarium filtration device as defined in claim 5, wherein the portion of said outlet conduit bounding said first operative inlet opening has an outwardly flaring configuration and said conduit is adjustably movable through a range of positions of movement relative to said water-displacing piston to thereby selectively control the amount of water forced into said outlet conduit during each of said strokes of said piston away from said alternate position.

7. An aquarium filtration device as defined in claim 5, wherein said piston is fabricated at least in part of magnetically attracted material and is surrounded by a magnetic field-producing coil effective, upon operation, to actuate said piston through successive strokes.

8. An aquarium-filtering system as defined in claim 7, wherein said magnetic field-producing coil is sealed off from said water volume in said filtering tank.

9. An aquarium filtration device as defined in claim 2, wherein said water-displacing member is provided therein with a bore extending through one end thereof and a small opening at the other end of said water-displacing member communicating with said bore, said small opening being adjacent to and in alignment with said submerged first operative inlet opening such that during each of said strokes away from said alternate position, a jet of water issues out of said small opening and is directed into said first operative inlet opening of said outlet conduit.

10. An aquarium filtration device as defined in claim 9, wherein said filtering tank outlet conduit is oriented vertically, and the movement of said water-displacing member during said strokes is similarly vertically oriented.

11. A filtration device for use with an aquarium tank, said device comprising a filtering tank operatively associated with said aquarium tank, said filtering tank containing a volume of water, a filtering tank outlet conduit having first and second operative openings at opposite ends thereof operatively arranged with said first operative opening submerged in said water volume in said filtering tank to define an inlet opening and said second operative opening in communication with said aquarium tank to define an outlet opening such that there is fluid flow of water from said second operative outlet opening of said outlet conduit into said aquarium tank, said submerged first operative opening of said outlet conduit including an outwardly flaring configuration to facilitate the movement of water into said conduit, and a valveless pumping means including a water-displacing piston operatively arranged for movement through strokes between a position removed from said first operative opening of said outlet conduit and an alternate position in closer proximity thereto, said piston being provided therein with a bore extending through one end thereof and a small opening at the other end of said piston communicating with said bore, said small opening being adjacent to and in alignment with said flared first operative opening such that during each of said strokes away from said alternate position, a jet of water issues out of said small opening and is directed into said flared opening of said outlet conduit, whereby said jet of water by displacement causes a fluid flow of water through said outlet conduit to said second operative opening from where the water flows into said aquarium tank.